United States Patent [19]
Dilluvio et al.

[11] Patent Number: 5,904,394
[45] Date of Patent: May 18, 1999

[54] LATCHING AND SWITCH OPERATING SYSTEM FOR A CONVERTIBLE ROOF

[75] Inventors: Christopher J. Dilluvio, Warren; Kim E. Taylor, Farmington Hills, both of Mich.

[73] Assignee: ASC Incorporated, Southgate, Mich.

[21] Appl. No.: 08/926,245

[22] Filed: Sep. 5, 1997

Related U.S. Application Data

[62] Division of application No. 08/381,121, Jan. 31, 1995, Pat. No. 5,755,467.

[51] Int. Cl.⁶ ..................................................... B60J 7/185
[52] U.S. Cl. ............................................................. 296/121
[58] Field of Search ............................................... 296/121

[56] References Cited

U.S. PATENT DOCUMENTS

| | | | |
|---|---|---|---|
| 3,584,912 | 6/1971 | Leger | 296/121 |
| 5,042,869 | 8/1991 | Brin | 296/121 |

*Primary Examiner*—Gary C. Hoge
*Attorney, Agent, or Firm*—Harness, Dickey & Pierce, P.L.C.

[57] ABSTRACT

A convertible roof latching and switch operating system provides an actuator which moves a first latch toward a vehicle centerline and a second latch away from a vehicle centerline in order to engage their respective strikers. In another aspect of the present invention a movable handle is directly and mechanically coupled to the pair of latches. In a further aspect of the present invention, the handle also operates one or more switches which activate driving means for raising or lowering a convertible roof.

39 Claims, 8 Drawing Sheets

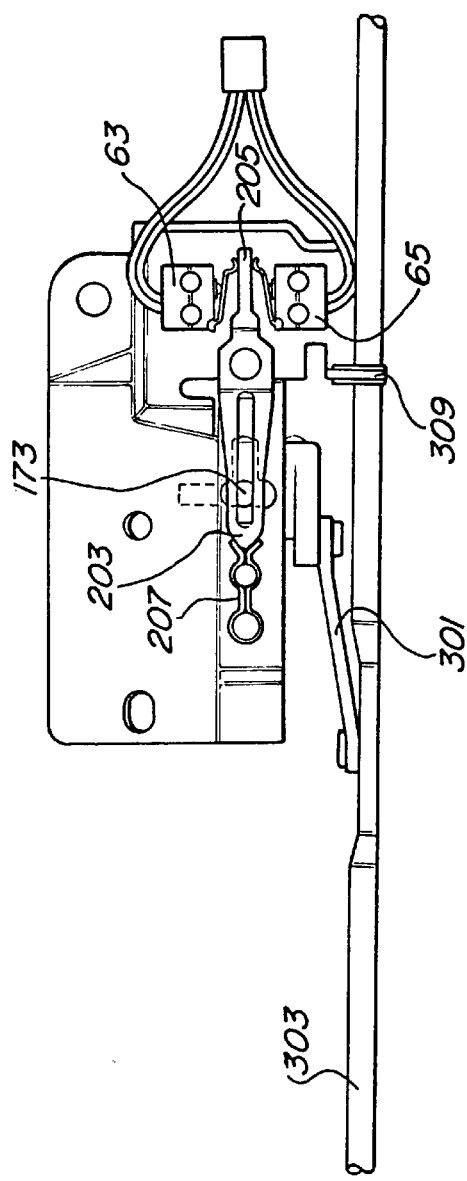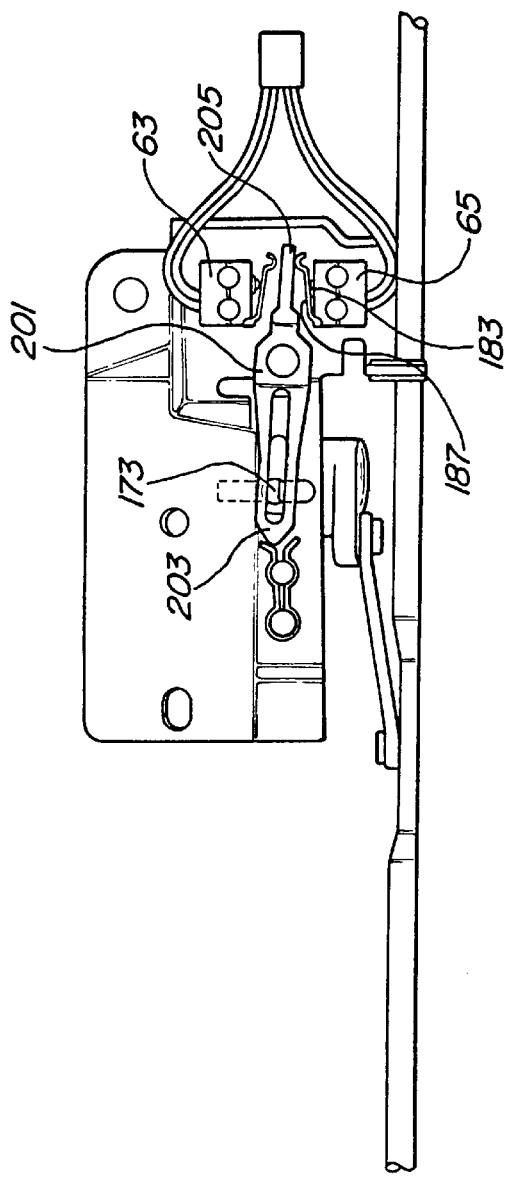

5,904,394

LATCHING AND SWITCH OPERATING SYSTEM FOR A CONVERTIBLE ROOF

This is a divisional patent application of U.S. patent application Ser. No. 08/381,121, filed Jan. 31, 1995, U.S. Pat. No. 5,755,467.

BACKGROUND AND SUMMARY OF THE INVENTION

The invention relates generally to automotive convertible roofs and specifically to a latching and switch operating system for an automotive vehicle convertible roof.

It is common to employ a variety of latches to retain a convertible roof to a front header panel and tonneau cover of an automotive vehicle. The front header panel is a structural member extending crosscar above a windshield. The tonneau cover is a rigid member which pivotably covers a boot well between a rear seat and a trunk. Such conventional latches are often provided near the outboard corners of the front header and tonneau cover, and may either be moved by one or more manual handles, a central hydraulic unit or an electric motor. Examples of such constructions are disclosed within the following U.S. Pat. Nos. 5,301,987 entitled "Convertible Top Stack Latch" which issued to Tokarz et al. on Apr. 12, 1994; 5,085,483 entitled "Convertible Top Latching Mechanism" which issued to Alexander on Feb. 4, 1992; 5,042,869 entitled "Latching Arrangement for a Motor Vehicle Top" which issued to Brin on Aug. 27, 1991; 3,425,742 entitled "Locking Means for Locking the Top of a Convertible Automobile" which issued Rauber on Feb. 4, 1969; 2,916,327 entitled "Power Operated Convertible Top Header Latch" which issued to Gilson on Dec. 8, 1959; 2,785,914 entitled "Locking Mechanism for Convertible Top" which issued to Thomas et al. on Mar. 19, 1957; 2,709,621 entitled "Convertible Top Header Lacking Mechanism" which issued to Votypka et al. on May 31, 1955; and, 2,360,524 entitled "Latch for Convertible Automobile Top" which issued to Simpson on Aug. 17, 1944. The disclosures of all these patents are incorporated by reference herewithin. The last six of the afore-referenced latching system patents appear difficult to operate, overly complicated, heavy, cumbersome to package, aesthetically displeasing and expensive to manufacture.

Furthermore, recent convertible roofs are remotely operable through use of a driver actuable, two-way rocker switch located on a center floor mounted console. Upon switch actuation, the convertible roof is raised or lowered by an electric motor or hydraulic actuated linkage system. However, these traditional roof actuation switches are operated independently from the front header latches. This has proven problematic when a vehicle driver depresses the roof opening switch without disengaging the convertible roof latches. When this occurs, the convertible roof driving motor attempts to retract the convertible roof without success which can lead to premature failure of the motor, linkage system, latches or fuses. Various parts may be loosened or destroyed by this incorrect operation. Even when parts are not damaged, this sequentially incorrect operation is annoying to the vehicle driver.

In accordance with the present invention, a preferred embodiment of a convertible roof latching system provides an actuator which moves a first latch toward a vehicle centerline and a second latch away from a vehicle centerline in order to engage their respective strikers. In another aspect of the present invention a pivotable handle is directly and mechanically coupled to the pair of latches. In a further aspect of the present invention, a handle of a switch operation system activates one or more switches which causes a convertible roof to be raised or lowered. In yet another aspect of the present invention, a front header mounted handle serves to operate a pair of switches which activate a pair of convertible roof latches.

The latching and switch operating system of the present invention is advantageous over traditional constructions since the present invention integrates activation of many different convertible roof functions into a single, multi-function, sequentially correct, driver accessible actuator. The present invention insures correct sequential operation of the latching and roof raising/lowering features through an easily accessible, simple to use and aesthetically pleasing device. Furthermore, the present invention is relatively inexpensive and easily packaged as compared to conventional systems. Additional advantages and features of the present invention will become apparent from the following description and appended claims, taken in conjunction with the accompanying drawings.

BRIEF DESCRIPTION OF THE DRAWINGS

FIG. 6 is a top elevational view showing the central portion of the preferred embodiment latching and switch operating system of the present invention of the prior figures, disposed in a vertical switch neutral position;

FIG. 7 is a top elevational view showing the central portion of the preferred embodiment latching and switch operating system of the present invention of the prior figures, disposed in a switch operating position;

DETAILED DESCRIPTION OF THE PREFERRED EMBODIMENT

Figure 1:
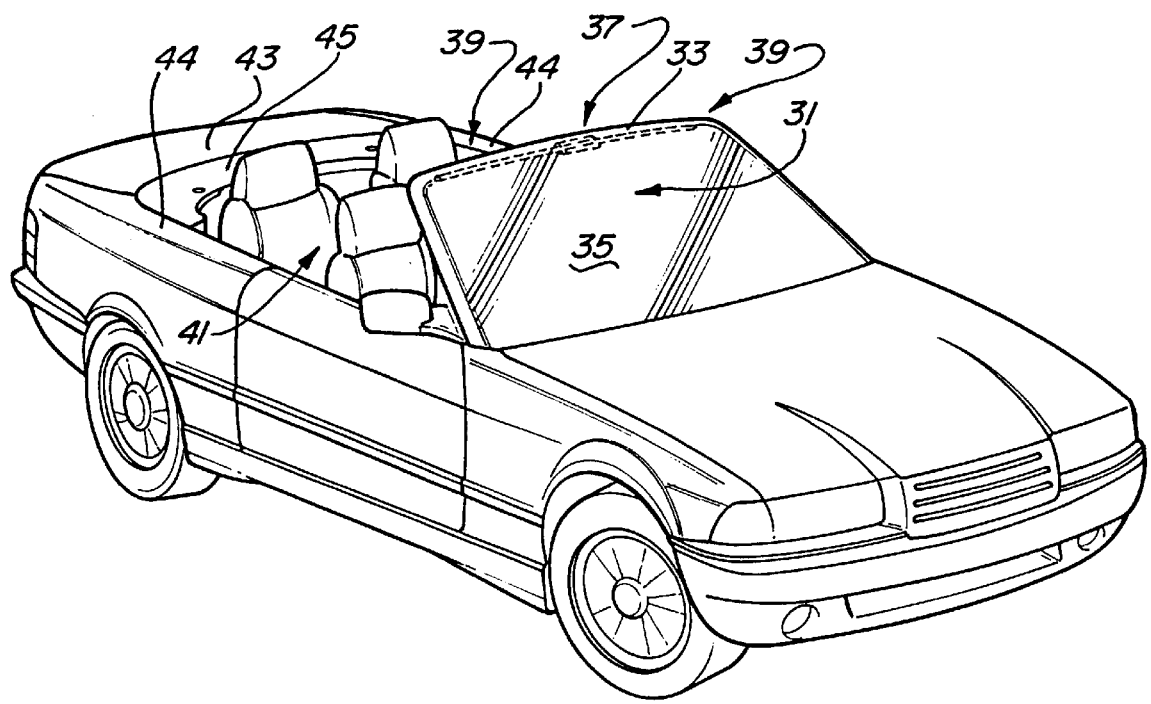
FIG. 1 is a perspective view showing an automotive vehicle employing a preferred embodiment latching and switch operating system of the present invention.
Figure 11:
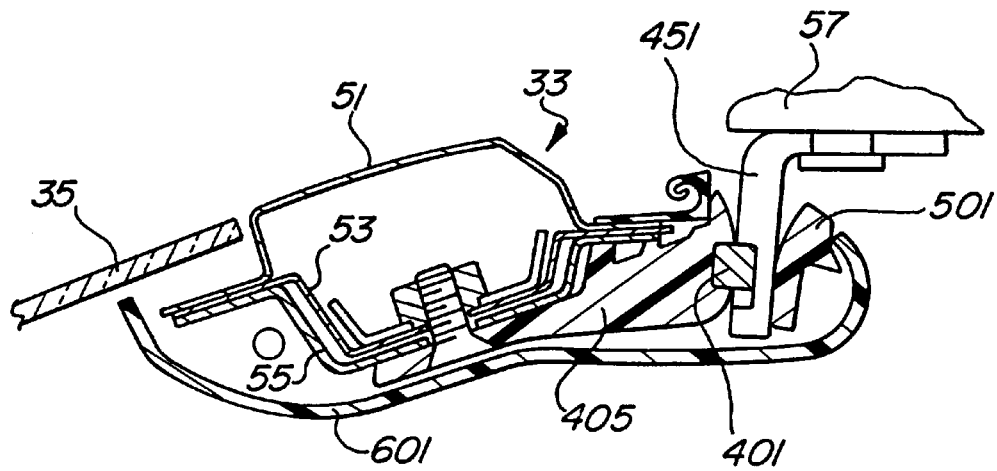
FIG. 11 is a sectional view, taken along line 11—11 of FIG. 4, showing an outboard portion of the preferred embodiment latching and switch operating system of the present invention of the prior figures, disposed in the engaged position.
Figure 12:
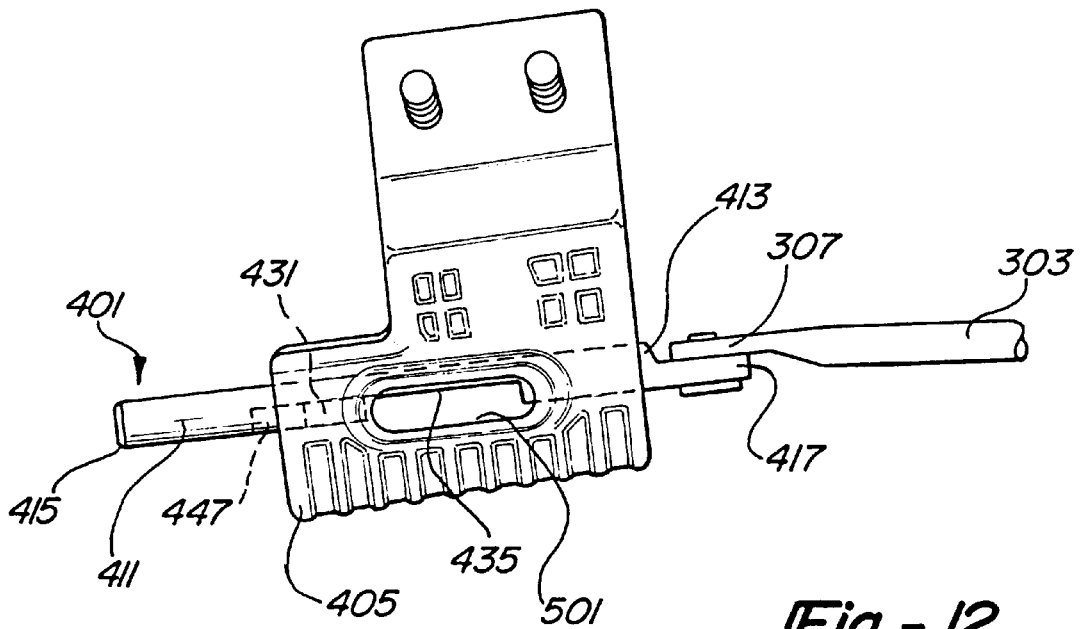
FIG. 12 is a top elevational view showing the outboard portion of the preferred embodiment latching and switch operating system of the present invention of the prior figures, disposed in the disengaged position.
Figure 13:
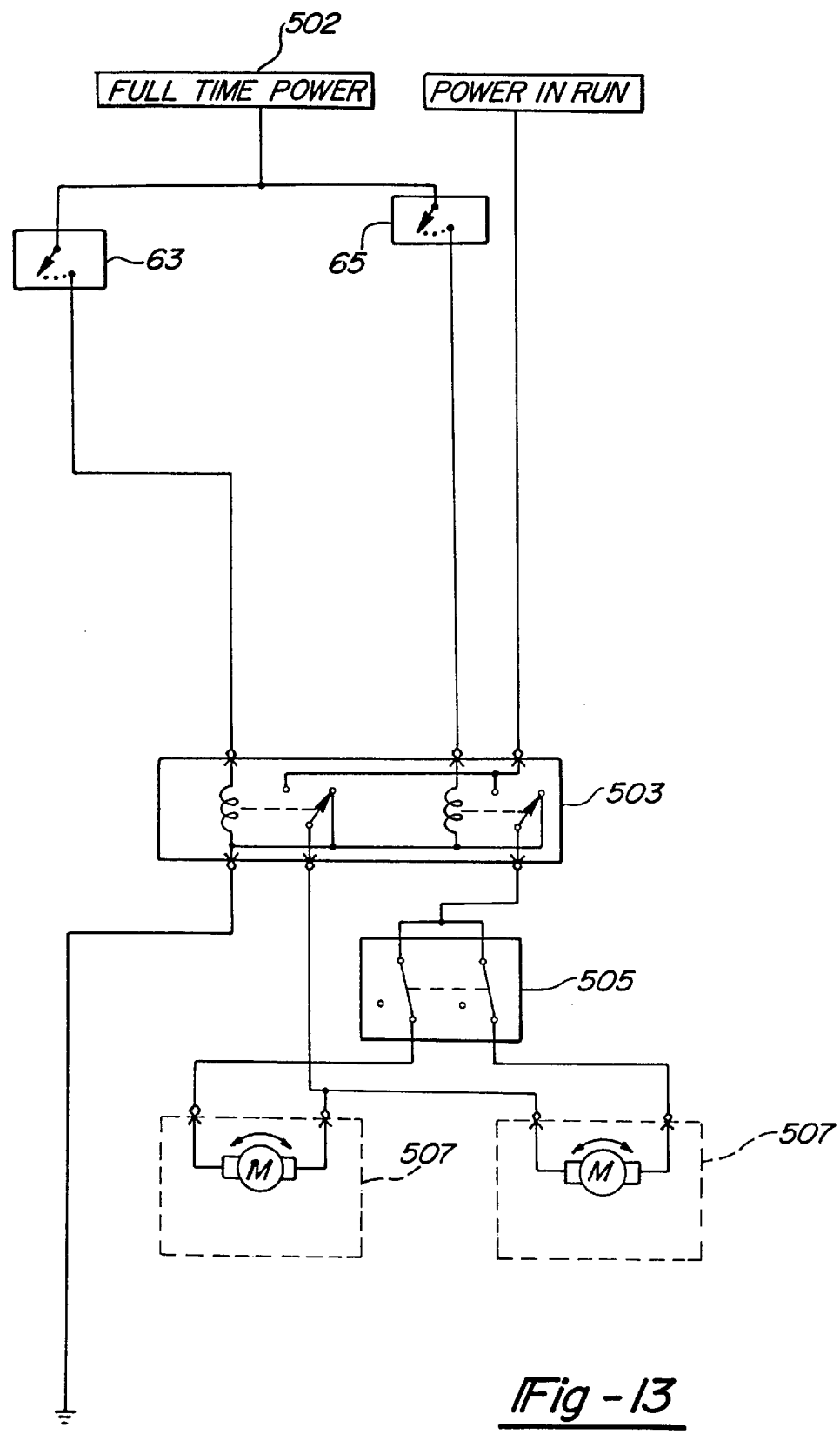
FIG. 13 is an electrical schematic diagram showing the preferred embodiment latching and switch operating system of FIGS. 1–9, 11 and 12.

An automotive vehicle having a lowered or stowed convertible roof is shown in FIG. 1. A preferred embodiment of a latching and switch operating system 31 of the present invention is shown mounted below a front header structural member 33. Front header 33 is located above a windshield 35 and between a pair of A pillars. Latching and switch operating system 31 has a central portion 37 mounted along a centerline of the vehicle, and a pair of outboard portions 39 disposed adjacent to the crosscar corners of front header 33. The automotive vehicle further has a passenger compartment 41, a trunk compartment covered by a trunk lid 43, quarter panels 44 and a boot well covered by a pivotable tonneau cover 45. A fixed tulip panel between the trunk lid and tonneau cover may also be used. FIG. 11 illustrates a front header 33 constructed from a sheet steel header outer panel 51, header inner panel 53 and header inner frame 55. Convertible roof 57 can be constructed as a soft top variety wherein fabric is stretched between a plurality of foldable roof bows, or a hard top variety wherein rigid outer panels span between structural side rails and crosscar bows. Examples of such convertible roofs are described and shown in the following U.S. Pat. Nos. 5,161,852 entitled "Convertible Top With Improved Geometry" which issued to Alexander et al. on Nov. 10, 1992; 5,106,145 entitled "Convertible Stack System" which issued to Corder on Apr. 21, 1992; 4,720,133 entitled "Convertible Top Structure" which issued to Alexander et al. on Jan. 19, 1988; and, 2,007,873 entitled "Vehicle Body Top Capable of being Stowed Away" which issued to Paulin on Jul. 9, 1935; the disclosures of all these patents are incorporated by reference herewithin.

Figure 2:
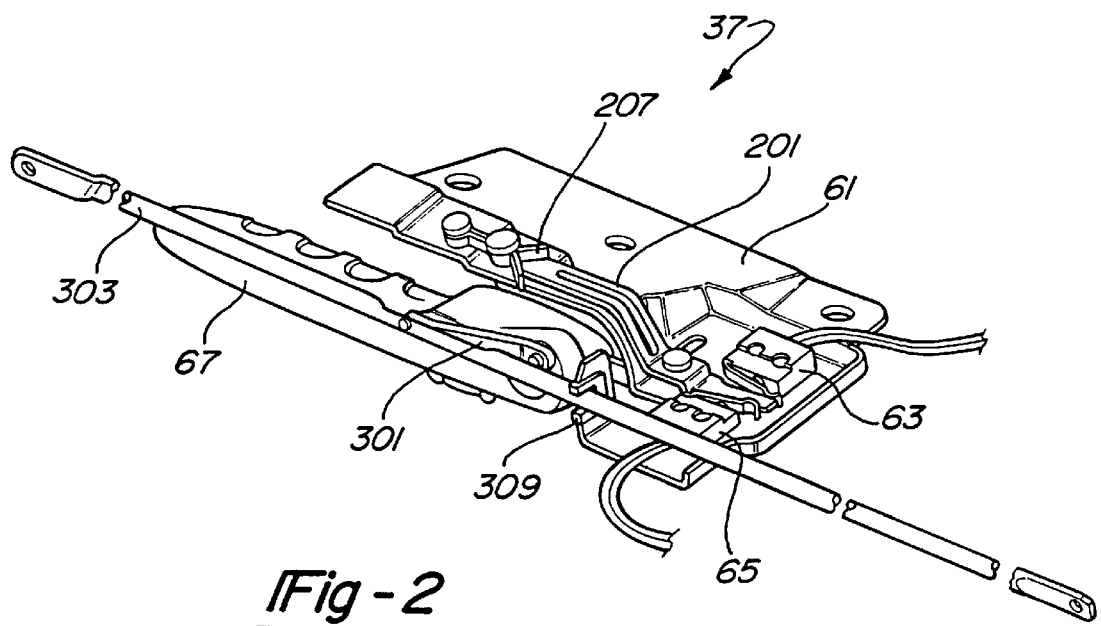
FIG. 2 is a perspective view, as seen from behind and above the vehicle, showing a central portion of the preferred embodiment latching and switch operating system of the present invention of FIG. 1.
Figure 3:
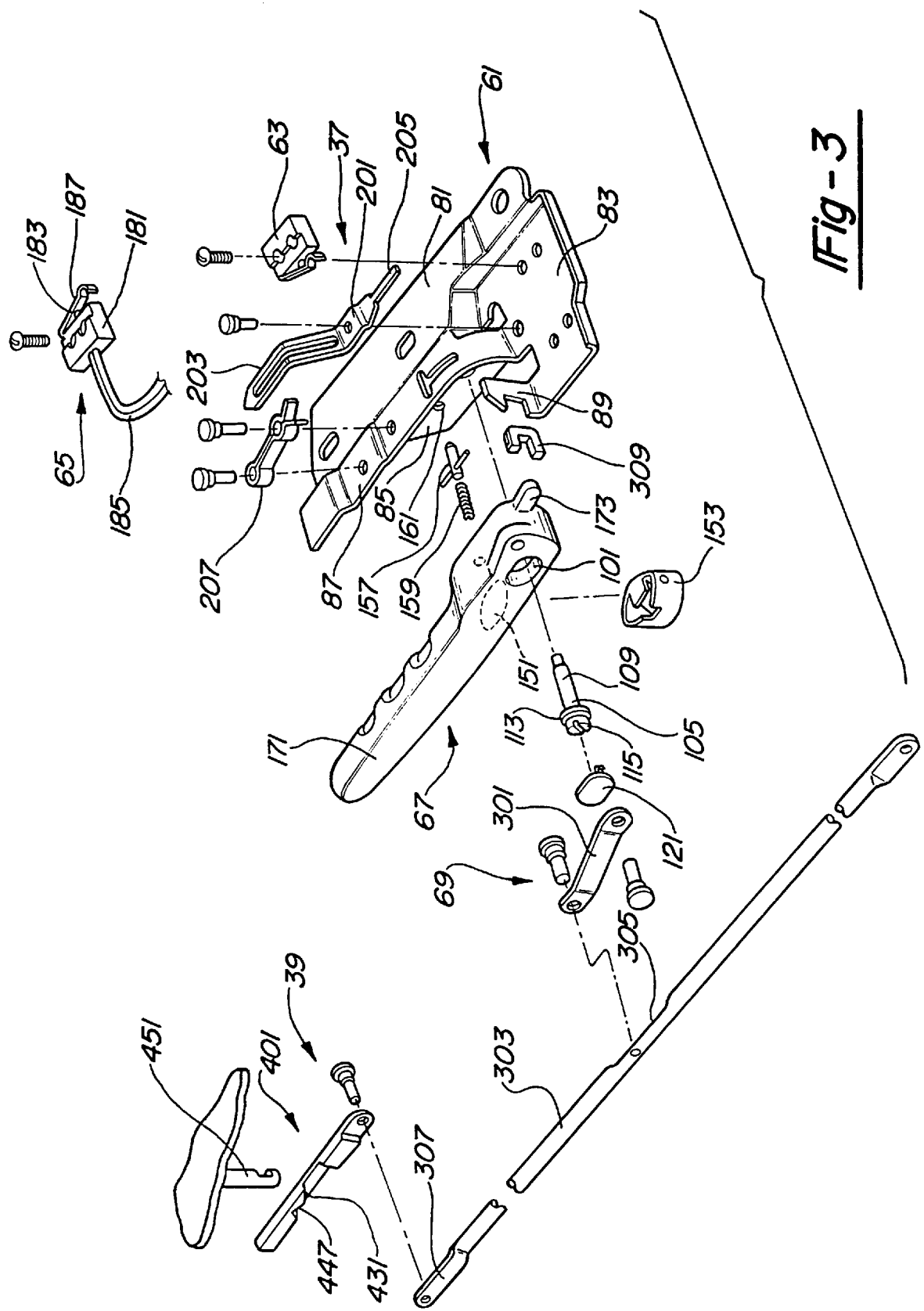
FIG. 3 is an exploded perspective view showing the preferred embodiment latching and switch operating system of the present invention of the prior figures.

Referring to FIGS. 2 and 3, the preferred embodiment of central portion 37 of the present invention latching and switch operating system 31 includes a stamped steel bracket 61, a pair of switches 63 and 65, a handle actuator 67 and a latch linkage device 69. Bracket 61 is a two piece weldment being further defined by a header mounting plate 81, a switch mounting plate 83, an upturned structure 85, a handle guide plate or return flange 87 and an isolator support 89. Header mounting plate 81 is riveted or bolted to the lower surface of front header 33.

Figure 8:
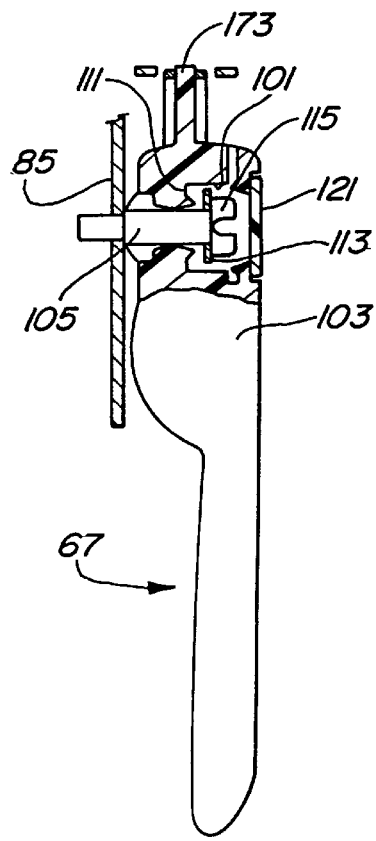
FIG. 8 is a side elevational view, taken partly in section, showing a handle of the preferred embodiment latching and switch operating system of the present invention of the prior figures, disposed in the vertical switch neutral position.
Figure 9:
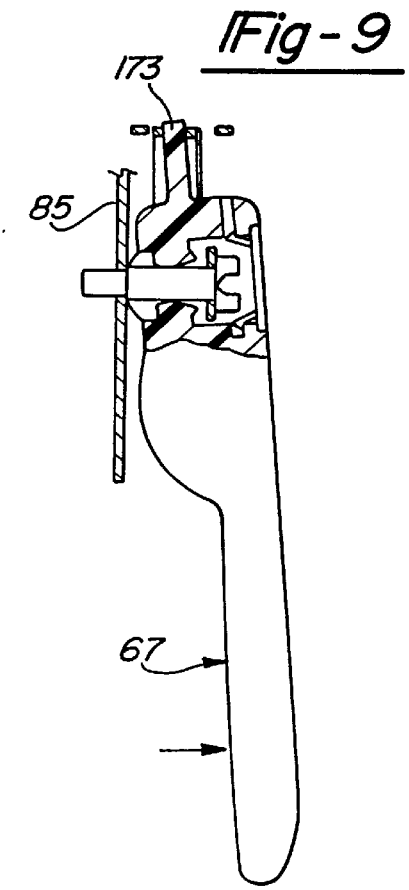
FIG. 9 is a side elevational view, taken partly in section, showing the handle of the preferred embodiment latching and switch operating system of the present invention of the prior figures, disposed in the switch operating position.

Handle 67 has a stepped passageway 101 running through a base 103 thereof. This can best be seen in FIGS. 3 and 8. A threaded bolt 105 extends through passageway 101 and is attached to upturned structure 85 of bracket 61. An injection molded plastic cap 121 aesthetically covers passageway 101. This arrangement allows handle 67 to pivot fore and aft between a forwardly pushed position (not shown), a vertically neutral position (FIG. 8) and a rearwardly pulled position (FIG. 9). Additionally, handle 67 can pivot in a crosscar manner about bolt 105 between a horizontally stowed latched position (FIG. 4) and the vertically neutral unlatched position (FIG. 5). A pair of beveled spring washers or a compression spring can alternately be positioned to surround a shank 109 of bolt 105 for compression between an internal shelf 111 of handle 67 and a washer 113 juxtapositioned beneath a bolt head 115.

Base 103 of handle 67 preferably has an orifice 151 within which fits an outwardly biased push button 153. Push button 153 is an injection molded plastic part which engages a T-shaped metallic locking pin 157. Locking pin 157 is biased by a compression spring 159 into an outwardly locking position whereby a tip thereof engages with an aperture 161 within bracket 61. These parts are best illustrated within FIG. 3. Depressing button 153 into handle 67 will cause locking pin 157 to retract from bracket 61 thereby allowing pivoting of handle 67. Handle 67 further has an elongated hand gripping segment 171 and a finger 173 extending opposite therefrom. Handle 67 is preferably injection molded from a high heat engineering grade plastic.

Switches 63 and 65 are preferably single pole, single throw off-the-shelf switches having a plastic housing 181, a plunger 183, a wire pigtail 185 and internally located conductive contacts (not shown). Such switches can be purchased from Burgess-Saia Inc. of Illinois or from Cherry Electrical Products Co. of Wisconsin. Each switch further has a spring steel arm 187 positioned adjacent to the inwardly movable plunger 183. Inward movement of plunger 183 closes the conductive contacts thereby completing an electrical circuit. Switches 63 and 65 are both screwed to switch mounting plate 83 of bracket 61. A stainless steel stamped armature 201 is rotatably riveted to switch mounting plate 83 of bracket 61 such that an offset section 203 having an elongated slot therein traps and moves with finger 173 when handle 67 is moved in the fore and aft direction. This is best illustrated in FIGS. 6 and 7. Rotation of armature 201 will thereby cause a projecting section 205 thereof to selectively depress arm 187 and plunger 183 of either switch 63 or 65. A forcated spring steel biasing member 207 is fastened upon return flange 87 of bracket 61 through use of shoulder rivets. Biasing member 207 engages a distal end of offset section 203 to assist armature 201, plunger 183 and handle 67 in returning back to their neutral and nonactivated positions. A T-shaped slot within return flange 87 further serves to guide finger 173 during movement.

Latch linkage device 69 preferably consists of an idler link 301 pivotably attached to handle 67 and a single elongated rod 303 pivotably attached to idler link 301. Shoulder rivets are used for these attachments. Idler link 301 is made from stamped, high strength steel and rod 303 is made from partially flattened, round stock, high strength steel. Rod 303 has a flattened medial portion 305 and flattened ends 307. A plastic yoke 309 fits within a cutout of isolator support 89 thereby defining a rod isolator. A portion of rod 303 rides within yoke 309. Yoke 309 serves to discourage undesired bending deformation of rod 303 upon pushing of a portion thereof. Alternately, the isolator may be a separately constructed part from bracket 61 such that it can be remotely positioned. Linkage device 69 can alternately be replaced with other mechanical coupling means such as a handle directly connected to a single rod, multiple linkages and rods, a rack and pinion mechanism, one or more cables, a set of gears, a bellcrank and linkage mechanism, sprockets and chains, belts, or the like.

Referring now to FIGS. 3–5, 11 and 12, the preferred embodiment of outboard portion 39 of the present invention latching and switch operating system 31 is comprised of a first latch 401 and a second latch 403, each of which are captured by a retainer 405. Retainer 405 is preferably an injection molded high temperature, engineering grade plastic piece that is bolted to the lower portion of front header 33. Each latch 401 and 403 has an outboard body segment 411 and an inboard body segment 413 with a uniformly square cross sectional shape and a taper 415 on a distal end thereof. Each latch 401 and 403 has a flat 417 on a proximal inboard end thereof for fastening to the corresponding flat 307 of rod 303 by shoulder bolts. Latch 401 has a declining engagement surface 431 with a leading segment 433 pointing toward the vehicle centerline. A notched away segment 435 is longitudinally disposed between leading segment 433 and inboard body segment 413. Latch 403 has a declining engaging surface 441 and a leading segment 443 pointing away from the vehicle centerline such that a notched away segment 445 is located between leading segment 443 and outboard body segment 411. Each outboard body segment 411 further has a backdraft ramp or interlock surface 447 that provides an engaged interlock with strikers 451.

A pair of metallic strikers 451 are mounted to a front roof bow of convertible roof 57. Each striker 451 has a substantially horizontal catch 453 accessible in a crosscar direction. Strikers 451 are insertable through openings 501 of retainer 405 and through notched away segments 435 and 445 of their respective latches 401 and 403 when handle 67 is pivoted to its vertical unlatched position so that latches are linearly slid to their disengaged positions (see FIGS. 5 and 12). After strikers 451 have been inserted, handle 67 is then pivoted back to its stowed and latched position such that latch 401 is pulled to its engaged position and latch 403 is pushed to its engaged position. When moved toward their engaged positions, engagement surfaces 431 and 441 pull down and secure catch 453 of each striker 451 securely to front header 33. Catches 453 are interlocked along surfaces 447 when latches 401 and 403 are in their fully engaged positions. Of course, the latching and switch operating system of the present invention can be alternately mounted upon the convertible roof with the strikers extending upward or rearward from the front header. Also, the handle can be located in a remote location such as a floor center console or the like wherein the latches can be pushed and pulled through a somewhat flexible cable system. Furthermore, the latches may be located below a pivotable or slidable rigid tonneau cover, trunk lid, stationary tulip panel or quarter panels for engagement with strikers projecting from a five bow or rear hard-top roof section.

Figure 4:
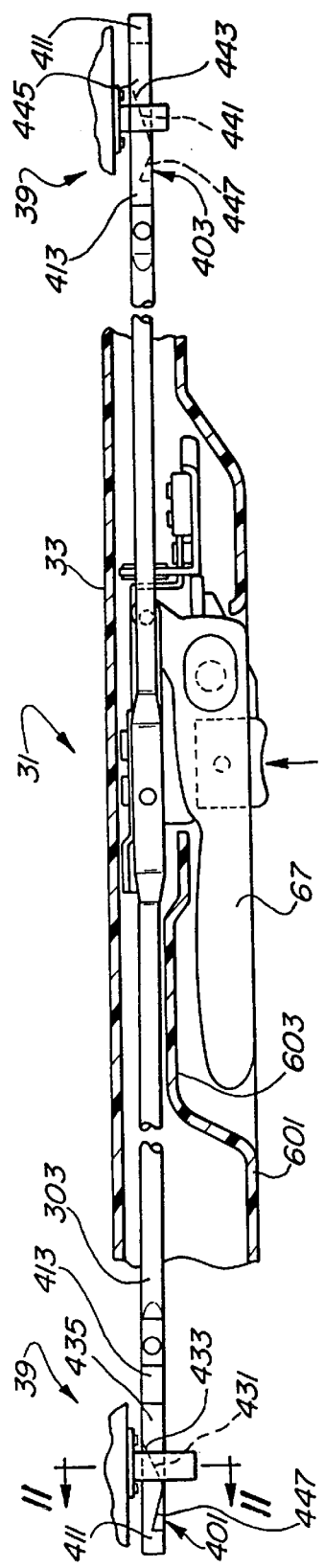
FIG. 4 is a rear elevational view, taken partly in section, showing the preferred embodiment latching and switch operating system of the present invention of the prior figures, disposed in an engaged and latched position.
Figure 5:
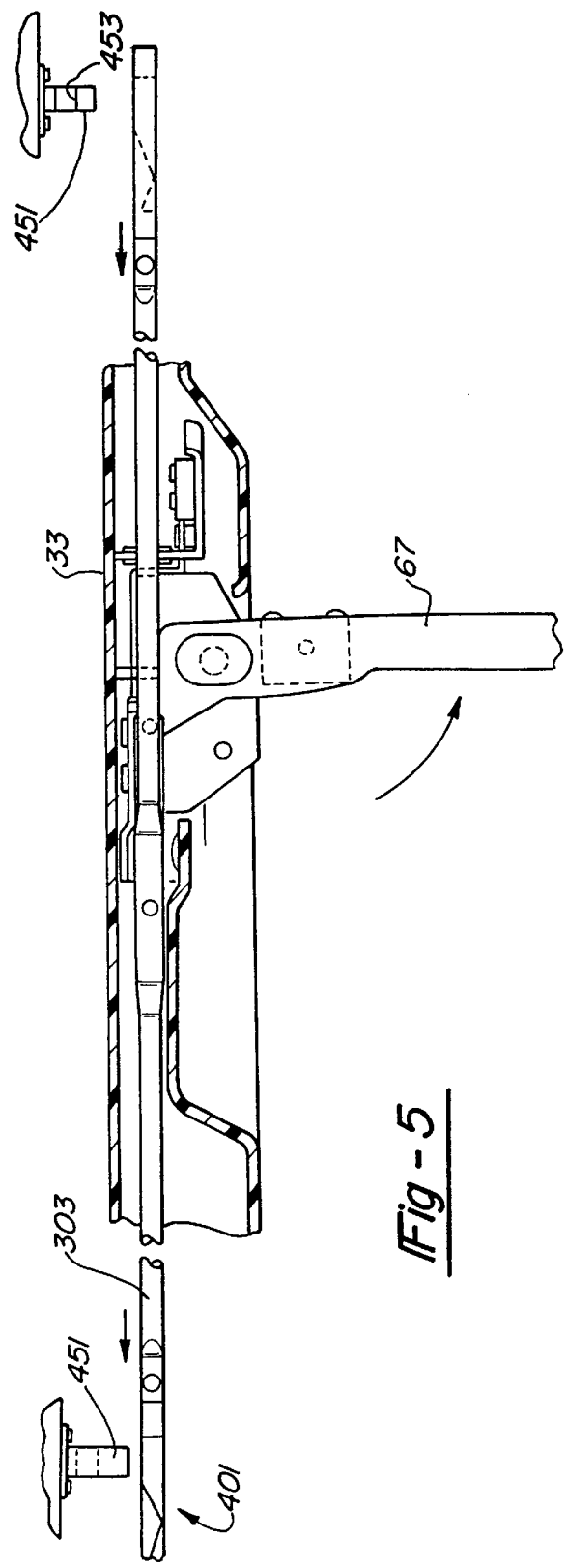
FIG. 5 is a rear elevational view, taken partly in section, showing the preferred embodiment latching and switch operating system of the present invention of the prior figures, disposed in a disengaged and unlatched position.

A garnish molding 601, illustrated in FIGS. 4 and 11, serves to aesthetically cover the center and outboard portions of the present invention latching and switch operating system 31. This garnish molding 601 can be retained to header 33 through various known techniques such as plastic Christmas tree fasteners, screws or metal clips. Garnish molding 601 further has a recessed pocket 603 within which handle 67 is stowed. This provides an aesthetically attractive flush appearance between handle 67 and garnish molding 601.

Figure 14:
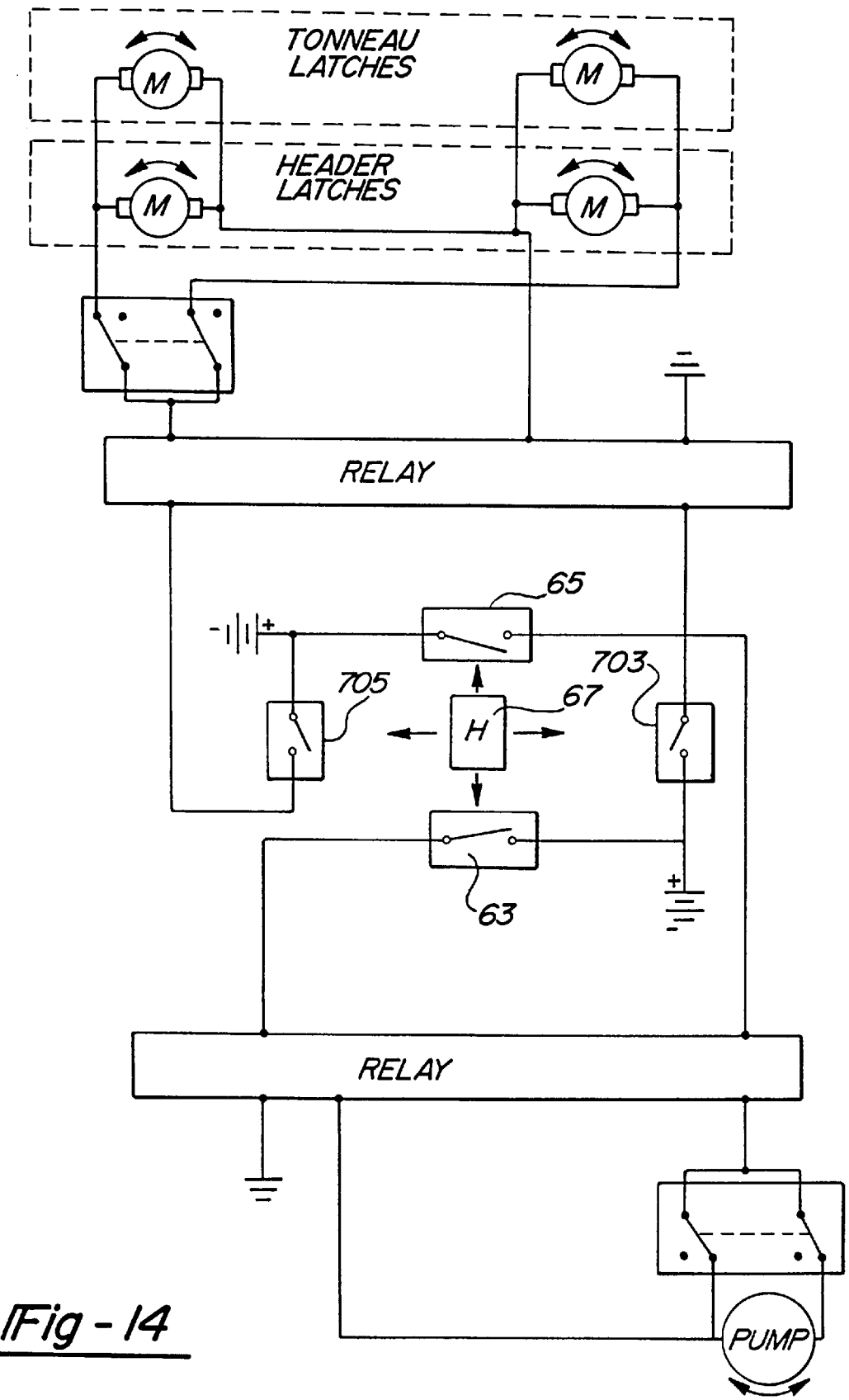
FIG. 14 is an electrical schematic diagram showing the alternate embodiment latching and switch operating system of the present invention of FIG. 10.

Referring now to FIGS. 6, 7 and 14, rearward pulling of gripping portion of handle 67 in a fore and aft vertical manner causes finger 173 to push offset section 203 of armature 201, which in turn rotates projecting segment 205 to depress arm 187 and plunger 183 of switch 65. Switch 65 then allows electrical current to flow from a full time power supply 502 to a normally open relay 503. Relay 503 is then closed thereby allowing current from a secondary power circuit to travel through a double pole, double throw bypass switch 505 and then onto a pair of electromechanical motors 507. Electromechanical motors 507 are symmetrically mounted within the quarter panels to drive a top stack driving mechanism to a retracted and stowed position below the tonneau cover in the boot well. Hydraulic actuation may be used instead of the motors. The top stack driving mechanism consists of balance links, sector gears, rear roof rails or the like. Alternately, when handle 67 is forwardly pushed in a fore and aft manner, finger 173 causes armature 201 to depress the arm and plunger of switch 63. This provides a reversal of electric current or polarity to motors 507 such that the convertible roof is moved to its raised position covering the passenger compartment.

Figure 10:
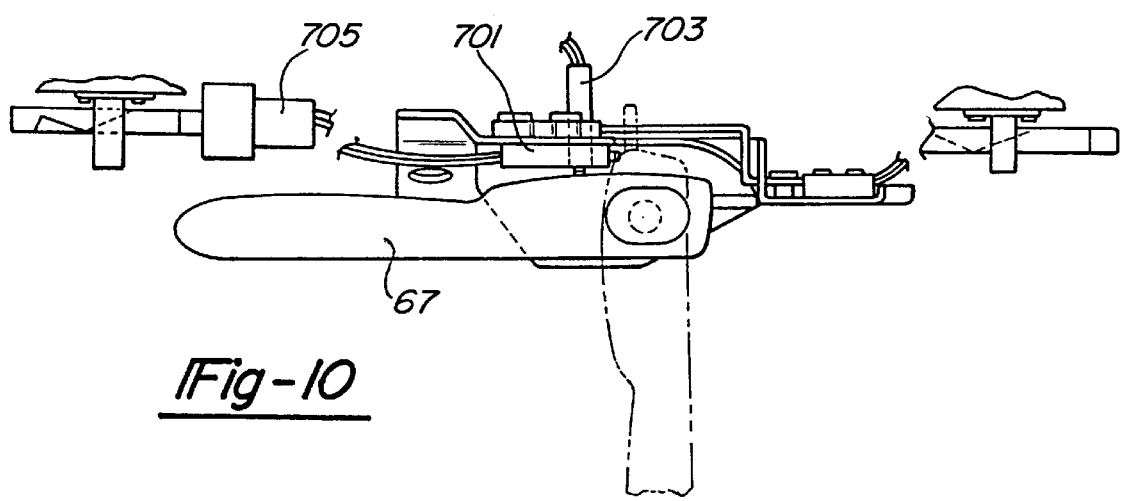
FIG. 10 is a rear elevational view, with portions broken away therefrom, showing an alternate embodiment of the latching and switch operating system of the present invention.

An alternate embodiment of the present invention latching and switch operating system is illustrated in FIGS. 10 and 14. In this alternate embodiment, handle 67 operates a pair of switches 701 and 703 through movement in a crosscar pivoting manner. Switches 701 and 703 control one centrally mounted motor 705 (FIG. 10), a pair of latch actuating motors remotely located on the front header, and/or a pair of latch motors remotely located on the tonneau cover. The switches connected to the top stack driving motors or pump previously described with the preferred embodiment can also be incorporated herewith. Of course, a single switch and position sensing potentiometers or the like may operably activate and control engaging and disengaging movement of a pair of latches whether located on the header or tonneau cover. Similarly, a single switch and potentiometers can activate and control raising and lowering movement of the convertible roof.

While the preferred embodiment of this latching and switch operating system has been disclosed, it will be appreciated that various modifications may be made without departing from the present invention. For example, the convertible roof driving electromagnetic devices and/or the latch electromechanical activating devices may be switched on and off through use of various other handle position sensing devices such as single or multiple potentiometers, rheostats, programmed microprocessors, capacitive sensors, magnetic sensors, piezo-electric sensors, or the like. Furthermore, an electric motor actuator or solenoid actuator can replace the disclosed handle actuator when employed in combination with the present invention latch linkage device or latches. Differing electrical circuits and control systems can also be employed to operate the previously disclosed electromechanical devices. These electromechanical devices may further consist of solenoids, electromagnets, etc. The shapes and interactions between the latches and strikers may be varied. For example, the pivoting handle and single rod coupled thereto may serve to rotate a pair of hook-like latches. The engagement surfaces of the latches may also have other hook-like or rounded configurations thereto. Additionally, the handle may slide rather than pivot in a crosscar manner. Moreover, any combination of the previously disclosed alternate constructions may be combined together. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for use with an automotive vehicle, said apparatus comprising:

a convertible roof;

a panel affixed to the vehicle, said convertible roof being moveable relative to said panel;

an elongated handle moveably mounted to said panel;

a mechanism interfacing with said convertible roof;

an electromechanical device operably causing movement of said mechanism; and a first electric switch electrically connected to said electromechanical device, movement of said handle mechanically interfacing with and operating said first switch.

2. The apparatus of claim 1 wherein said mechanism is a first latch movable from a disengaged position to an engaged position upon movement of said handle to a latching position.

3. The apparatus of claim 2 further comprising a second latch movable from a disengaged position to an engaged position upon movement of said handle to said latching position.

4. The apparatus of claim 3 further comprising:

mechanical means for coupling said handle to said first and second latches; and a front header of said automotive vehicle;

wherein said first and second latches are slidably mounted to said front header for crosscar movement between said engaged and disengaged positions upon crosscar movement of said handle from said latching position to an unlatching position.

5. The apparatus of claim 4 wherein said mechanical means includes:

a single rod coupled to both of said latches; and an idler link coupling said handle to said rod.

6. The apparatus of claim 3 wherein said first latch moves toward a centerline of said automotive vehicle and said second latch moves away from said centerline of said automotive vehicle when moving from said disengaging to said engaging positions.

7. The apparatus of claim 1 further comprising a second electric switch mounted adjacent said handle along a side opposite from said first switch, whereby movement of said handle in a first direction operates said first switch and movement of said handle in a second direction opposite from said first direction operates said second switch.

8. The apparatus of claim 7 wherein said mechanism is a roof driving mechanism mechanically coupled to said convertible roof, wherein said roof driving mechanism is movably driven by said electromechanical device;

whereby operation of said first switch causes said electromechanical device to move said roof driving mechanism thereby raising said convertible roof;

operation of said second switch causes said electromechanical device to reverse direction thereby retracting said roof driving mechanism and said convertible roof.

9. The apparatus of claim 7 further comprising:

a hand grip segment of said handle being moved from a substantially vertical neutral position to a forwardly pushed position so as to operate one of said switches;

wherein said hand grip segment of said handle is moved from said neutral position to a rearwardly pulled position to operate the other of said switches.

10. The apparatus of claim 9 wherein said handle is further pivotable from said neutral position to a substantially horizontal stowed position oriented in a crosscar manner.

11. The apparatus of claim 10 wherein said mechanism includes a pair of latches being mechanically coupled to said handle, said pair of latches movable from an engaging position to a disengaging position upon respective crosscar movement of said handle.

12. The apparatus of claim 1 wherein said handle includes:

a grip segment accessible for full hand gripping by a vehicle occupant;

a base having a stepped passageway through which a bolt is located for handle pivoting about said bolt; and a finger extending from said base opposite from said grip segment.

13. The apparatus of claim 1 further comprising an armature causing a plunger on said first switch to be depressed upon selective contact of a finger of said handle, said plunger of said switch causing said switch to complete an electrical circuit.

14. The apparatus of claim 1 further comprising:

a second electric switch positioned adjacent to said handle, said second electric switch also being electrically connected to said first electromechanical device;

a second electromechanical device;

a third electric switch positioned adjacent to said handle and being electrically connected to said second electromechanical device; and a fourth electric switch positioned adjacent said handle and also being electrically connected to said second electromechanical device;

wherein said mechanism includes a pair of latches selectively driven by said second electromechanical device from an engaging position to a disengaging position and vice versa by movement of said handle selectively operating said third and fourth switches.

15. The apparatus of claim 1 further comprising:

a second electric switch positioned adjacent to said handle, said second electric switch being electrically connected to said first electromechanical device;

second and third electromechanical devices;

a third electric switch positioned adjacent to said handle and being electrically connected to said second and third electromechanical devices; and a fourth electric switch positioned adjacent to said handle and being electrically connected to said second and third electromechanical devices;

wherein said mechanism includes two pairs of latches selectively driven by said second and third electromechanical devices from an engaging position to a disengaging position and vice versa by movement of said handle selectively operating said third and fourth switches.

16. The apparatus of claim 1 wherein said convertible roof is further defined as having a rigid front hard-top roof section.

17. The apparatus of claim 1 wherein said convertible roof is further defined as a fabric covered soft top roof.

18. The apparatus of claim 1 wherein said mechanism is a hydraulic actuated roof linkage mechanism and wherein said electromechanical device includes a pump which operates said hydraulic actuated roof linkage mechanism.

19. The apparatus of claim 1 further comprising a front header, wherein said handle is coupled for movement to a substantially central portion of said front header.

20. An apparatus for use with a convertible roof of an automotive vehicle, said apparatus comprising:

an elongated handle;

a convertible roof interfacing mechanism;

a first electrical switch;

an electromechanical device operatively causing movement of said mechanism in response to actuation of said first electric switch;

said first electric switch being electrically connected to said electromechanical device, operable movement of said handle mechanically interfacing with and operating said first electric switch; and a housing surrounding said first switch, wherein a majority of said handle is mounted external to said housing.

21. An apparatus for use with a convertible roof of an automotive vehicle, said apparatus comprising:

an elongated handle movable in both a substantially crosscar direction and a substantially fore and aft direction;

an electromechanical device operably causing movement of said mechanism; and a first electric switch electrically connected to said electromechanical device, movement of said handle mechanically interfacing with and operating said first switch.

22. An apparatus for use with a convertible roof of an automotive vehicle having a front header, said apparatus comprising:

an elongated handle coupled for movement to said front header;

a first electric switch mounted to said front header and being operable by movement of said handle; and a second electric switch mounted to said front header adjacent to a side of said handle opposite from said first switch;

whereby movement of said handle in a first direction operates said first switch and movement of said handle in a second direction opposite from said first direction operates said second switch.

23. The apparatus of claim 22 wherein said handle includes a hand grip segment being moved from a substantially vertical neutral position to a forwardly pushed position so as to operate said first switch, said hand grip segment of said handle further being moved from said neutral position to a rearwardly pulled position to operate said second switch.

24. The apparatus of claim 22 wherein said handle is further pivotable from said neutral position to a substantially horizontal stowed position oriented in a crosscar manner.

25. The apparatus of claim 22 further comprising:

a third electric switch positioned adjacent to said handle; and a fourth electric switch positioned adjacent to said handle;

whereby movement of said handle selectively operates said third and fourth switches.

26. The apparatus of claim 22 further comprising a housing surrounding said first switch, wherein said handle is mounted entirely external to said housing.

27. The apparatus of claim 22 further comprising a pair of latches mechanically coupled to said handle, said pair of latches being movable from an engaging position to a disengaging position by respective crosscar movement of said handle.

28. A method of operating a convertible roof of an automotive vehicle having a handle, an electric switch and a driving mechanism, said method comprising:

(a) moving said handle from a first position to a second position;

(b) operating said electric switch through movement of said handle; and (c) actuating said driving mechanism electrically connected to said switch to raise said convertible roof from a stowed position to a raised position.

29. The method of claim 28 further comprising the steps of:

(a) pivoting said handle from said second position to a third position;

(b) moving a first latch as a function of step (a); and (c) moving a second latch as a function of step (a).

30. The method of claim 29 further comprising the steps of:

(a) pulling said first latch toward a centerline of said automotive vehicle to engage a striker; and (b) pushing said second latch away from said centerline of said automotive vehicle to engage a second striker.

31. The method of claim 28 further comprising the sequential steps of:

(a) moving said handle from said second position;

(b) operating a second electric switch as a function of step (a); and (c) actuating said driving mechanism electrically connected to said second switch to lower said convertible roof from said raised position to said stowed position.

32. An automotive vehicle comprising:

a convertible roof moveable from a stowed position to a raised position;

a handle moveable from a first position to a second position;

an electrical switch actuable by movement of said handle; and a driving mechanism operably moving said convertible roof in response to a change in condition of said switch;

movement of said handle from said first position to said second position operably causing said driving mechanism to move said convertible roof from said stowed position to said raised position.

33. The vehicle of claim 32 further comprising multiple latches moveable in response to movement of said handle between third and fourth positions.

34. The vehicle of claim 33 further comprising an electromagnetic device coupled to at least one of said latches, movement of said handle between said third and fourth positions causing said electromagnetic device to move said at least one latch.

35. The vehicle of claim 33 wherein at least one of said latches is mounted adjacent a rear position of said convertible roof.

36. The vehicle of claim 33 wherein said latches move in a crosscar direction.

37. The vehicle of claim 32 further comprising a windshield header, said handle being moveably mounted to said header.

38. The vehicle of claim 32 wherein said handle is moveable in a crosscar direction.

39. The vehicle of claim 32 wherein said handle is elongated for being grabbed inside of a user's hand.

* * * * *

UNITED STATES PATENT AND TRADEMARK OFFICE
CERTIFICATE OF CORRECTION

Sheet 1 of 9

PATENT NO. : 5,904,394
DATED : May 18, 1999
INVENTOR(S) : Christopher J. Dilluvio et al It is certified that error appears in the above-identified patent and that said Letters Patent is hereby corrected as shown below: On the title page: Item [56]

Column 2, under References Cited, U.S. Patent Documents, insert -- RE 24,375 4/1956 Thompson III --.

Column 2, under References Cited, U.S. Patent Documents, insert -- 1,056,333 3/1913 Hill --.

Column 2, under References Cited, U.S. Patent Documents, insert -- 1,174,366 3/1916 Van Den Plas --.

Column 2, under References Cited, U.S. Patent Documents, insert -- 1,269,311 6/1918 Rixon --.

Column 2, under References Cited, U.S. Patent Documents, insert -- 1,831,494 11/1931 Hynes et al --.

Column 2, under References Cited, U.S. Patent Documents, insert -- 1,856,531 5/1932 Berg --.

Column 2, under References Cited, U.S. Patent Documents, insert -- 1,892,512 12/1932 Kemp --.

Column 2, under References Cited, U.S. Patent Documents, insert -- 1,905,814 4/1933 Orlow --.

Column 2, under References Cited, U.S. Patent Documents, insert -- 1,929,371 10/1933 Hamilton --.

UNITED STATES PATENT AND TRADEMARK OFFICE
CERTIFICATE OF CORRECTION

Sheet 2 of 9

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

Column 2, under References Cited, U.S. Patent Documents, insert -- 2,007,873 7/1935 Paulin --.

Column 2, under References Cited, U.S. Patent Documents, insert -- 2,201,330 5/1940 Wernig --.

Column 2, under References Cited, U.S. Patent Documents, insert -- 2,360,524 10/1944 Simpson --.

Column 2, under References Cited, U.S. Patent Documents, insert -- 2,468,251 4/1949 Wiederman --.

Column 2, under References Cited, U.S. Patent Documents, insert -- 2,486,905 11/1949 Ackermans --.

Column 2, under References Cited, U.S. Patent Documents, insert -- 2,560,459 7/1951 Lundberg et al --.

Column 2, under References Cited, U.S. Patent Documents, insert -- 2,570,260 10/1951 Milhan --.

Column 2, under References Cited, U.S. Patent Documents, insert -- 2,570,261 10/1951 Milhan --.

Column 2, under References Cited, U.S. Patent Documents, insert -- 2,586,648 2/1952 Hale et al --.

UNITED STATES PATENT AND TRADEMARK OFFICE
CERTIFICATE OF CORRECTION

Sheet 3 of 9

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

Column 2, under References Cited, U.S. Patent Documents, insert -- 2,674,480 4/1954 Vigmostad --.

Column 2, under References Cited, U.S. Patent Documents, insert -- 2,709,621 5/1955 Votypka et al --.

Column 2, under References Cited, U.S. Patent Documents, insert -- 2,753,202 7/1956 Smith et al --.

Column 2, under References Cited, U.S. Patent Documents, insert -- 2,785,914 3/1957 Thomas et al --.

Column 2, under References Cited, U.S. Patent Documents, insert -- 2,831,718 4/1958 Hallek et al --.

Column 2, under References Cited, U.S. Patent Documents, insert -- 2,852,292 9/1958 Galla --.

Column 2, under References Cited, U.S. Patent Documents, insert -- 2,879,988 3/1959 Klisch --.

Column 2, under References Cited, U.S. Patent Documents, insert -- 2,916,327 12/1959 Gilson --.

Column 2, under References Cited, U.S. Patent Documents, insert -- 3,089,719 5/1963 Csizmansky --.

UNITED STATES PATENT AND TRADEMARK OFFICE
CERTIFICATE OF CORRECTION

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

Column 2, under References Cited, U.S. Patent Documents, insert -- 3,151,375 10/1964 Schevenell --.

Column 2, under References Cited, U.S. Patent Documents, insert -- 3,353,864 11/1967 Antaya et al --.

Column 2, under References Cited, U.S. Patent Documents, insert -- 3,362,740 1/1968 Burns --.

Column 2, under References Cited, U.S. Patent Documents, insert -- 3,400,562 9/1968 Bloss --.

Column 2, under References Cited, U.S. Patent Documents, insert -- 3,425,742 2/1969 Rauber --.

Column 2, under References Cited, U.S. Patent Documents, insert -- 3,443,834 5/1969 Andres --.

Column 2, under References Cited, U.S. Patent Documents, insert -- 3,586,360 6/1971 Perrotta --.

Column 2, under References Cited, U.S. Patent Documents, insert -- 3,751,949 8/1973 Castle --.

Column 2, under References Cited, U.S. Patent Documents, insert -- 3,845,976 11/1974 Peterson --.

UNITED STATES PATENT AND TRADEMARK OFFICE
CERTIFICATE OF CORRECTION
Sheet 5 of 9

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

, Column 2, under References Cited, U.S. Patent Documents, insert -- 3,891,252 6/1975 Lehmann --.

, Column 2, under References Cited, U.S. Patent Documents, insert -- 4,439,649 3/1984 Cecchi --.

, Column 2, under References Cited, U.S. Patent Documents, insert -- 4,470,277 9/1984 Uyeda --.

Column 2, under References Cited, U.S. Patent Documents, insert -- 4,537,440 8/1985 Brockway et al --.

Column 2, under References Cited, U.S. Patent Documents, insert -- 4,618,180 10/1986 Muscat --.

Column 2, under References Cited, U.S. Patent Documents, insert -- 4,664,436 5/1987 Eyb --.

Column 2, under References Cited, U.S. Patent Documents, insert -- 4,702,505 10/1987 Alexander --.

, Column 2, under References Cited, U.S. Patent Documents, insert -- 4,720,133 1/1988 Alexander et al --.

. Column 2, under References Cited, U.S. Patent Documents, insert -- 4,746,163 5/1988 Muscat --.

UNITED STATES PATENT AND TRADEMARK OFFICE
CERTIFICATE OF CORRECTION

Sheet 6 of 9

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

:, Column 2, under References Cited, U.S. Patent Documents, insert -- 4,801,173 1/1989 Trenkler --.

Column 2, under References Cited, U.S. Patent Documents, insert -- 4,817,999 4/1989 Drew --.

First page, Column 2, under References Cited, U.S. Patent Documents, insert -- 4,819,983 4/1989 Alexander --.

Column 2, under References Cited, U.S. Patent Documents, insert -- 4,830,425 5/1989 Muscat --.

Column 2, under References Cited, U.S. Patent Documents, insert -- 4,830,426 5/1989 Schlachter et al --.

Column 2, under References Cited, U.S. Patent Documents, insert -- 5,042,869 8/1991 Brin --.

Column 2, under References Cited, U.S. Patent Documents, insert -- 5,046,767 9/1991 Muscat --.

-- Column 2, under References Cited, U.S. Patent Documents, insert -- 5,058,939 10/1991 Miilu --.

:, Column 2, under References Cited, U.S. Patent Documents, insert -- 5,064,241 11/1991 Ohrle --.

UNITED STATES PATENT AND TRADEMARK OFFICE
CERTIFICATE OF CORRECTION

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

Column 2, under References Cited, U.S. Patent Documents, insert -- 5,067,768 11/1991 Fischbach --.

Column 2, under References Cited, U.S. Patent Documents, insert -- 5,085,483 2/1992 Alexander --.

Column 2, under References Cited, U.S. Patent Documents, insert -- 5,088,777 2/1992 Ono et al --.

Column 2, under References Cited, U.S. Patent Documents, insert -- 5,161,852 11/1992 Alexander et al --.

Column 2, under References Cited, U.S. Patent Documents, insert -- 5,186,516 2/1993 Alexander et al --.

Column 2, under References Cited, U.S. Patent Documents, insert -- 5,225,747 7/1993 Helms et al --.

Column 2, under References Cited, U.S. Patent Documents, insert -- 5,269,586 12/1993 Hahn et al --.

Column 2, under References Cited, U.S. Patent Documents, insert -- 5,301,987 4/1994 Tokarz et al --.

Column 2, under References Cited, U.S. Patent Documents, insert -- 5,553,777 7/1996 Kleemann et al --.

UNITED STATES PATENT AND TRADEMARK OFFICE
CERTIFICATE OF CORRECTION

Sheet 8 of 9

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

Column 2, under References Cited, U.S. Patent Documents, insert -- 5,624,149 4/1997 Tokarz --.

Column 2, under References Cited, U.S. Patent Documents, insert -- 5,678,881 10/1997 Tokarz --.

Column 2, under References Cited, Foreign Patent Documents, insert -- 805,229 5/1951 Germany --.

Column 2, under References Cited, U.S. Patent Documents, insert -- 536,578 5/1941 Great Britain --.

Column 2, under References Cited, U.S. Patent Documents, insert -- 352,786 7/1931 Great Britain --.

Column 2, under References Cited, U.S. Patent Documents, insert -- 1505721 7/1970 Germany --.

UNITED STATES PATENT AND TRADEMARK OFFICE
CERTIFICATE OF CORRECTION

PATENT NO. : 5,904,394
DATED : May 18, 1999
INVENTOR(S) : Christopher J. Dilluvio et al It is certified that error appears in the above-identified patent and that said Letters Patent is hereby corrected as shown below:

Column 2, under References Cited, U.S. Patent Documents, insert -- 0188774 12/1985 European Patent Office --.

Column 2, under References Cited, U.S. Patent Documents, insert -- 0492006 12/1990 European Patent Office --.

Column 1, line 30, after "issued" insert -- to --.

Column 1, line 36, "Lacking" should be -- Locking --.

Signed and Sealed this

Seventh Day of November, 2000

Attest:

Q. TODD DICKINSON

*Attesting Officer*     *Director of Patents and Trademarks*